United States Patent [19]

Daniels

[11] 4,313,688

[45] Feb. 2, 1982

[54] METHOD AND APPARATUS FOR ASSEMBLING WOOD DECKS OR THE LIKE

[76] Inventor: Phillip D. Daniels, 4979 Lake Bluff Rd., West Bloomfield Township, Oakland County, Mich. 48033

[21] Appl. No.: 73,073

[22] Filed: Sep. 6, 1979

[51] Int. Cl.³ .......................... F16B 7/08; F16B 9/00; E04B 1/56; E04C 1/32
[52] U.S. Cl. .................................. 403/189; 403/190; 403/237; 52/299; 52/301; 52/712; 52/715
[58] Field of Search .............. 403/189, 190, 191, 192, 403/234, 235, 237, 262; 52/301, 299, 712, 713, 715, 735

[56] References Cited

U.S. PATENT DOCUMENTS

| | | | |
|---|---|---|---|
| 1,013,004 | 12/1911 | Ernst | 403/237 |
| 1,296,337 | 3/1919 | Sullivan | 403/190 |
| 1,419,536 | 6/1922 | Beck et al. | 52/301 |
| 1,423,991 | 7/1922 | Brooks | 52/713 X |
| 1,848,422 | 3/1932 | Isaacson | 52/712 X |
| 2,317,125 | 4/1943 | Barnett | 403/190 |
| 2,664,977 | 1/1954 | Starcevich | 52/301 |
| 3,420,019 | 1/1969 | Padilla | 52/715 X |
| 3,921,356 | 11/1975 | Hughes | 52/299 |
| 4,081,940 | 4/1978 | Hughes | 52/712 |
| 4,154,038 | 5/1979 | Kostecky | 52/713 |

FOREIGN PATENT DOCUMENTS

| | | | |
|---|---|---|---|
| 49543 | 8/1911 | Austria | 52/735 |
| 73267 | 3/1917 | Austria | 403/189 |
| 15840 | of 1912 | United Kingdom | 403/234 |

OTHER PUBLICATIONS

Erecto-Pat, Wood Deck Kits, Do It Yourself, Erecto-Pat, Inc., P.O. Box 519, Oxford, Michigan 48051.
Erecto-Pat-Wood Deck Kits, Instruction Do-It Yourself Book, Erecto-Pat, Inc., P.O. Box 519, Oxford, Michigan 48051.
Solve Post Problems with Ancor-EEZ and Top-TY, Save Time and Money, Woodmack Products Inc., 1080 N. Eleventh St., San Jose 12, Calif.
Teco, Wood Deck and Patio, "Build It Yourself" Plan Teco 5530 Wisconsin Ave., Washington, D.C. 20015
Strong-Tie Connectors, Structural Design & Load Values, Simpson Company 1470 Doolittle Drive, San Leandro, Calif. 94577.

Primary Examiner—James Kee Chi
Attorney, Agent, or Firm—Hiram P. Settle

[57] ABSTRACT

A multi-part connector for use in constructing a wooden deck or the like. The connector comprises identical, stamped metal elements which cooperatively embrace the upper end of a vertical post and project above the post to cooperatively receive a lateral beam therebetween. The elements each have an inwardly directed flange which is either (1) partially embedded in the upper end of wooden post or (2) engages and centers a metallic pipe post between the elements. An additional apertured plate is provided for cooperation with the two elements for securing the elements together in spaced relation to the element flanges and in embracing relation to the pipe post without bolting or otherwise securing the elements to the post. In use with either a wooden post or a pipe post, the beam overlies and bears upon the flange to aid in retaining the connector elements in place. The method involves the steps of assembling the connector elements on the post and utilizing the beam to retain the elements in place.

17 Claims, 10 Drawing Figures

U.S. Patent Feb. 2, 1982 Sheet 2 of 3 4,313,688
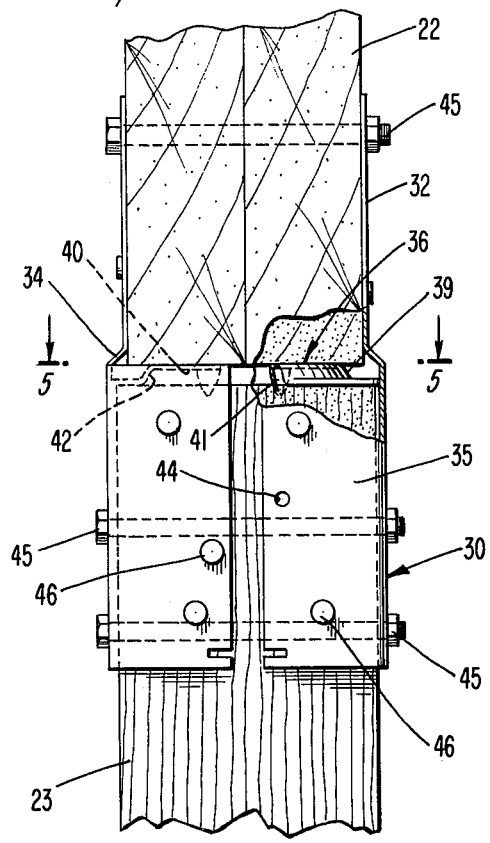
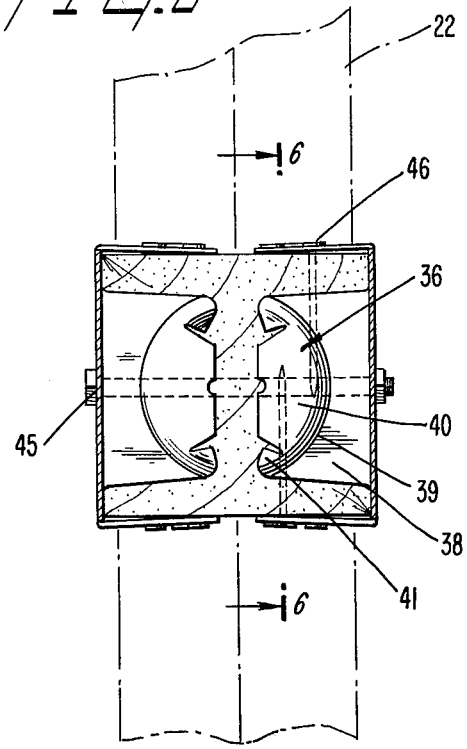
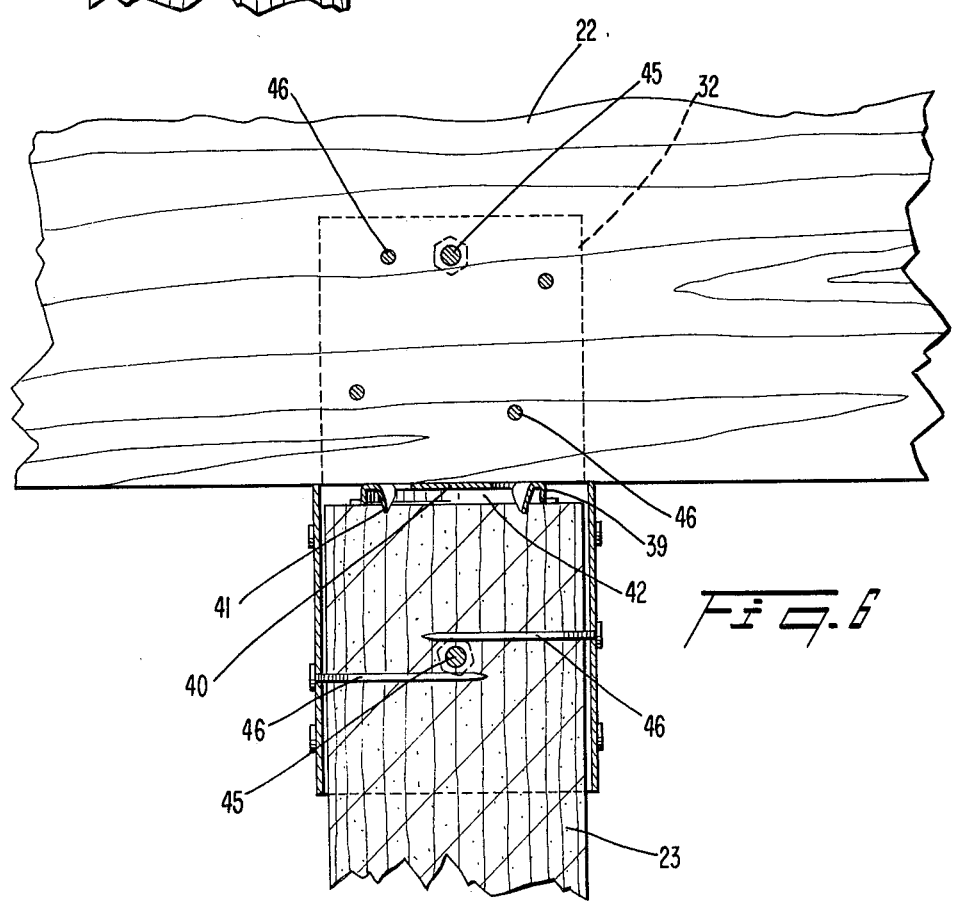

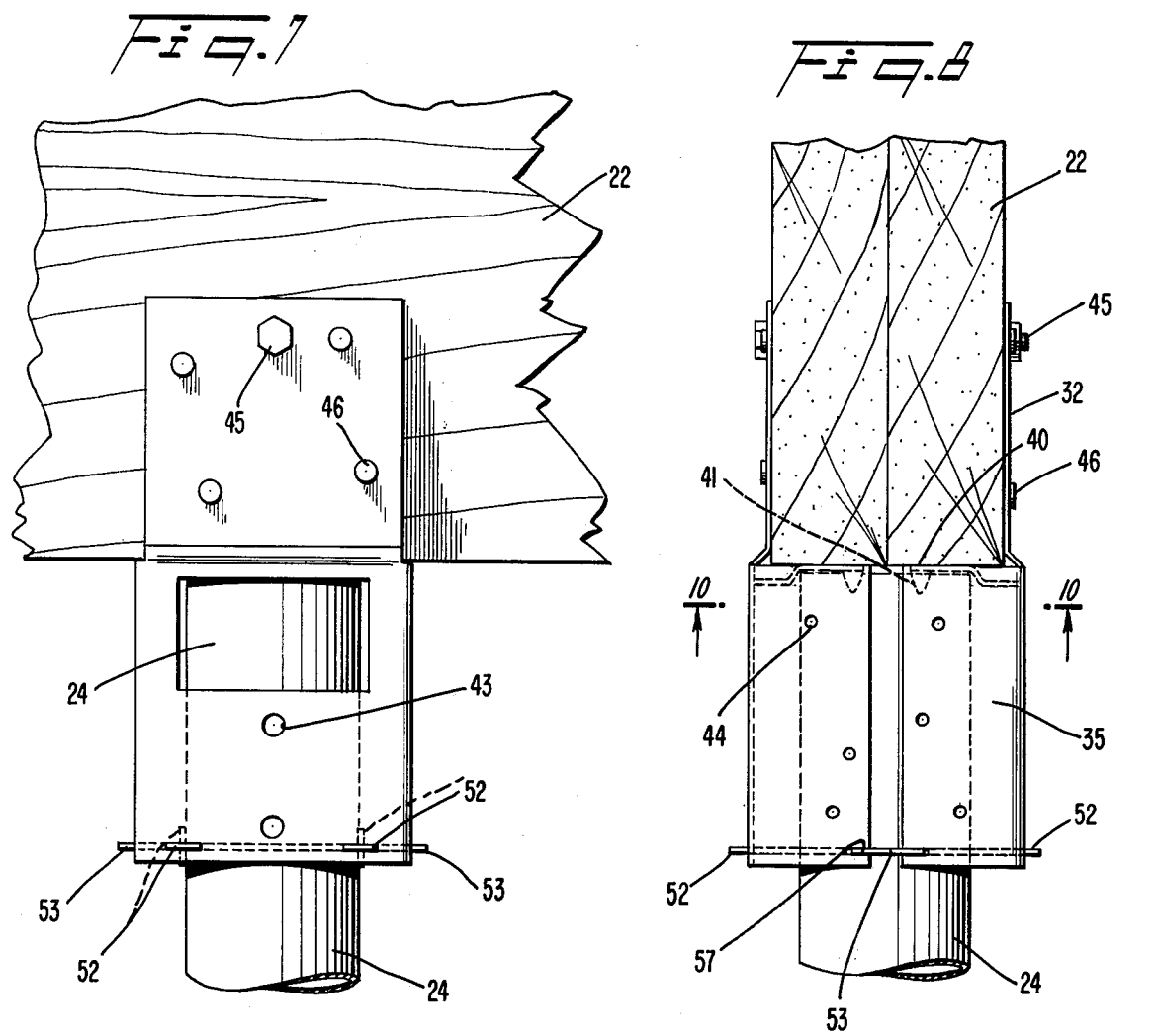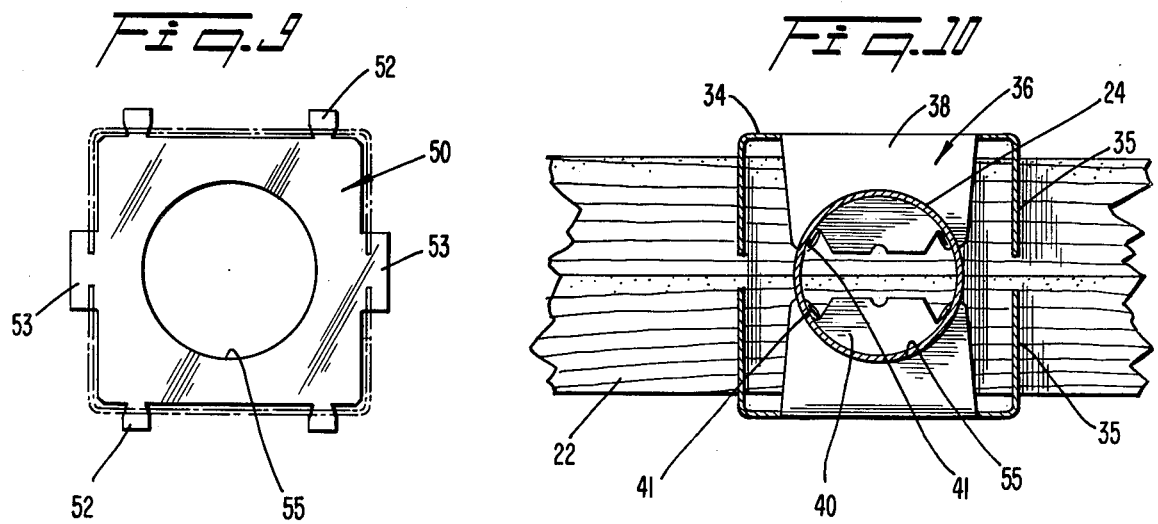

METHOD AND APPARATUS FOR ASSEMBLING WOOD DECKS OR THE LIKE

BACKGROUND OF THE INVENTION

Modern architecture makes liberal use of wooden decks or raised platforms for both utilitarian and aesthetic effect. Numerous homeowners would like to add such decks or platforms to their homes, as part of the "do-it-yourself" trend. However, the construction of wooden structures having the requisite structural strength and possessing the necessary safety precautions is generally beyond the skill of the average householder. Consequently, various forms of wood deck construction kits have been proposed, so that these kits along with the requisite detailed instructions, can be utilized by the do-it-yourselfer to construct a deck for his own home which is both aesthetically pleasing and structurally sound.

Generally, these types of decks are constructed by embedding in the earth or superimposing on footings a series of vertical posts upon which the deck is constructed. To interconnect these vertical posts with the horizontal beams which provide the main structural support for the deck would normally require substantial manual skills, an appreciation of the load factors involved, and a considerable amount of time and effort. Recently, various types of manual connectors have been sold in kit form to facilitate the post-beam interconnection. Typically, distinctly different connectors are provided for constructing a deck on wooden posts and for constructing a deck on pipe posts. These two basic types of kits must be inventoried by the hardware or lumber dealer, the connectors previously utilized for deck construction on pipe posts were quite expensive, and the connectors employed for construction of a deck on wooden posts were of a design such that the structural integrity of the finished deck was dependent solely upon the fastners, such as nails, utilized to secure the connector to the deck components.

BRIEF DESCRIPTION OF THE PRESENT INVENTION

The present invention now provides a new and novel connector assembly for securing the beam of a deck or the like to either a wooden post or a pipe post, and this connector comprises a plurality of stamped components which, when finally assembled and utilized, relies upon the weight of the deck itself to insure the structural integrity of the interconnection.

More specifically, the connector of the present invention comprises a pair of identical, stamped metal elements which cooperatively embrace the upper end of a vertical post, regardless of whether the post is metal or wooden. Portions of the elements project above each post to cooperatively receive a lateral beam therebetween.

Each element has a horizontal flange which is inwardly directed from the element to overlie the end of the post to be partially embedded therein where the post is wooden or to guidingly receive the end of the post where the post is a metal pipe. The beam superimposed on the post is also superimposed on the flange, and the weight of the deck carried by the beam acts directly upon the flange to retain the elements in position. The weight of the deck thus aids in assuring the structural integrity of the final assembled deck.

Where the deck is constructed on a metal post, an additional apertured plate is interposed between the two structural elements to be telescoped over the pipe to aid in additionally positioning the elements on the pipe. The plate is then rigidly interconnected with the elements to provide additional support for the elements without the necessity of directly attaching the elements to the pipe by bolts or the like.

It will be appreciated that this development provides substantial economic advantages by providing a single, multi-purpose connector for utilization with different types of deck supporting posts, and also provides substantial constructional and functional advantages so that a stronger, structurally integrated deck is produced.

The present invention also provides a novel method of constructing a deck wherein the separate interconnecting elements are assembled on the post with a portion of the elements extending over the upper extremity of the post, and then securing the beam in position with the element portions interposed between the beam and the post, for the structural reasons above discussed.

Of course, the connection assembly of the present invention can be utilized for purposes other than the construction of wooden decks. The assembly also finds utility in the construction of docks, porches, buildings, furniture or wherever mutually perpendicular structural elements may be connected. Further, the vertical orientation of the post and the beam may be reversed, may be horizontally oriented, or may be oriented to any desired spatial arrangement.

ON THE DRAWINGS

FIG. 4 is an enlarged fragmentary side elevational view of the deck of FIG. 1 illustrating the connector of the present invention utilized to interconnect a wooden post and a wooden beam;

FIG. 5 is a plan view corresponding to FIG. 4, with the beam illustrated in phantom outline; and FIG. 6 is a vertical sectional view taken along the plane 6—6 of FIG. 5;

FIG. 7 is a side elevational view illustrating the connector of the present invention utilized to interconnect a tubular metal post and a wooden beam;

FIG. 8 is a side elevational view similar to FIG. 7;

FIG. 9 is a sectional view taken along the plane 9—9, with parts of the connector shown in phantom outline; and FIG. 10 is a sectional view taken along the plane 10—10 of FIG. 8.

THE PREFERRED EMBODIMENT OF THE PRESENT INVENTION

Figure 1:
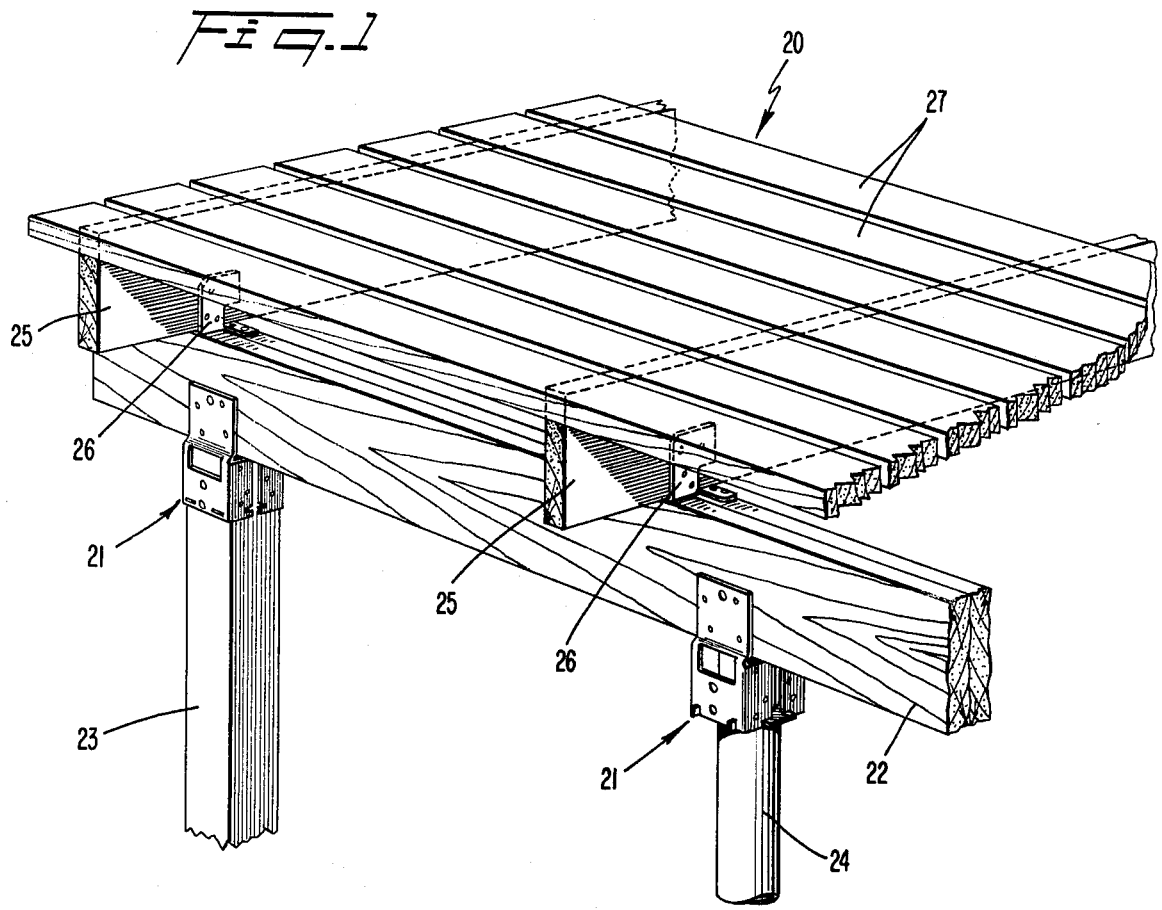
FIG. 1 is an elevation view, shown in perspective, of a complete deck utilizing the connector components of the present invention.
Figure 2:
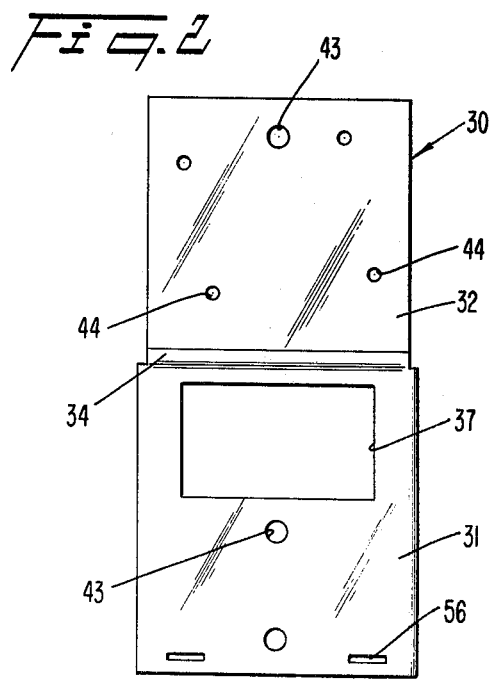
FIG. 2 is an exterior elevational view of one part of the multi-part connector of the present invention.
Figure 3:
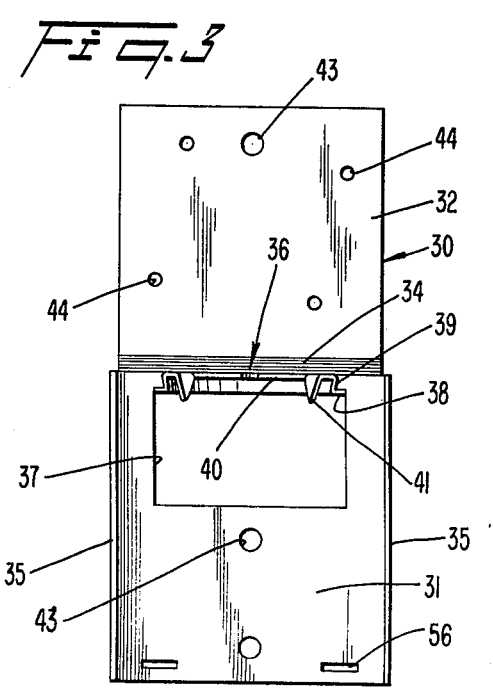
FIG. 3 is an elevational view of the connector part of FIG. 2, but showing the reverse side of the part.

As shown on the drawings, in FIG. 1, reference numeral 20 refers generally to a deck assembled by the utilization of connectors of the present invention. The connectors of the present invention are indicated generally by reference numeral 21 and are utilized to interconnect longitudinal beams 22 to either an upstanding wooden post 23 or an upstanding metallic post 24 of annular cross section, e.g. a pipe. Of course, in ordinary practice, it is not customary to utilize both the wooden post 23 and the pipe post 24 in the construction of a single deck 20, and the two different types of posts have been utilized in the illustrated embodiment of the deck 20 primarily for clarification and to demonstrate the versatility of the connector of the present invention. The posts generally are embedded in the earth beneath the deck 20 or are superimposed on pilings to project upwardly to provide the deck foundation.

The deck 20 of FIG. 1 is completed by transverse joist 24 superimposed on the beams 22 and connected to the beam by joist brackets 26 forming no part of the present invention. The deck flooring 27 is secured to the joists 25 to extend longitudinally of the deck, parallel to the beams 22. It will be readily understood that the term "deck" as herein utilized is intended to include within its scope various forms of wooden structures, and the terms "posts" and "beams" is also intended to cover various forms of construction elements whether wood or metal, or even plastic, which are of proper size and configuration to be interconnected by the connectors of the present invention.

As shown in detail in FIGS. 2–10, the connectors 21 comprise two identical connector elements 30 which are utilized in combination and in assembly to define a complete connector 21. The elements are stamped and cut from sheet metal stock, such as sheet steel, and can be readily and inexpensively produced in progressive dies. Each such connector element 30 includes a lower portion 31 of channel-shape adapted to embrace partially the upper end of a post 23, 24 and an upper, essentially planar portion 32 adapted to abut one vertical side surface of a beam 22, the portions 31 and 32 being integrally interconnected by a sloping joining portion 34.

The lower portion 31 is provided with integral sides or flanges 35 which are laterally spaced from one another through a dimension which preferably corresponds to the width of a standard "4×4" post 23, this dimension normally being about three and one-half inches. The upper portions 32 are off-set by the integral joining portion 34 so that, upon assembly, as illustrated in FIG. 1 and FIGS. 4–10, the upper portions 32 of the connectors are separated by a transverse dimension equal to the width of two "2×4", 2×6", or "2×8" or the like beams or three inches. Thus, the off-set portion 34 insures that the plane of the upper portion 32 is parallel to the plane of the lower portion 31, yet is offset one-quarter inch.

Each element 30 is provided with a medial, horizontally projecting flange 36 (FIGS. 3–6) which is struck from the portion 31, leaving the aperture 37, and this flange is interposed between the sides 35. This flange 36 comprises a first, radial joining portion 38 projecting normally to the plane of the lower portion 31, or horizontally in the normal orientation of the connector in use, and an upwardly extending embossment 39 of arcuate configuration and an upper horizontal planar extension 40 having, at each end, down-turned prongs 41 provided with pointed lower ends. It will be noted from FIG. 4 that the inner, under surface 42 of the joining projection 39 is inclined or partially conical, so that it will serve a centering and guiding function, in a manner to be hereafter more fully described.

Both the lower portion 31 and the upper portion 32 of each connector element 30 is provided with relatively large bolt holes 43 and with relatively smaller nail apertures 44 which are located in the end portion 32 and in the flanges 35 of the portion 31.

FIGS. 4 through 6 illustrate the connector 21 of the present invention as applied to a wooden post 23. After the posts 23 have been positioned, a pair of the elements 30 are applied to the post. The elements 30 are positioned so that the flanges 36 overlie the upper extremity of the post, and the flanges 36 are struck with a hammer to embed the projections 41 in the upper post ends, with the lower portions 31 contacting opposite sides of the posts with the flanges 35 projecting partially along the other marginal sides of the posts. Thus, the lower sections 31 partially embrace the end of the posts. At this time, the elements 30 are secured to the post by suitable means, as by bolts 45 positioned in the apertures 43 and traversing the posts by means of holes drilled in the posts. Additional fastening can be provided by nails 46 embedded in the posts as illustrated in FIG. 6. Thus, the elements 30 can be secured to the posts either by bolts 45 or by nails 46, or by the combination of bolts and nails. Further, it will be noted that the nail holes in the opposite side flanges 35 of the elements 30 are offset, so that nails driven from the side of one of the flanges 35 do not interfere with nails driven from the flange 35 at the opposite side of the post. If desired, large spikes or nails of 4 inch length or the like can be driven through the aligned bolt holes 43 and then clinched on the other sides of the post to form a strong, non-bolted structure.

Next, the beams 22 are positioned between the planar upper portions 32 of the elements 30, as best seen in FIG. 4 of the drawings. The beams do not directly contact the posts 23 because of the flanges 36 interposed therebetween, and the weight of the beams resting upon the flanges 36 will tend to force the flanges 36 downwardly, so that the pointed ends of the projections 41 are driven even further into the upper surface of the post.

After the beams are positioned as shown in FIG. 4, they are secured to the upper portions 32 by means of bolts 45 extending through the apertures 43 or by nails 46 extending through the apertures 44, or by a combination of bolts and nails, or by large spikes driven through the aligned bolt holes and clinched, as above described.

Where the connectors 21 are to be utilized in conjunction with a metal post of annular configuration, such as a pipe 24, an additional structural element 50 is utilized. As best illustrated in FIGS. 7–10, this structural element 50 comprises an essentially square plate 51 having projecting tabs 52 along opposite marginal edges and elongated locating flanges or projections 53 along the other two, opposing edges. It will also be noted that the under surfaces of the tabs 52 have inclined camming surfaces 54, for a purpose to be hereafter more fully described. The plate 50 is provided with a central aperture 55 of the size to receive therethrough the post pipe 24, with a clearance of about one-sixteenth to one-eighth inch.

As above explained, the distance between the interior surfaces of the side flanges 35 of the lower portion 31 is about three and five-eighths inches so that the elements 30 can be readily mounted on a standard four inch by four inch post, which measures three and one-half inches along each side. A standard two inch interior diameter pipe has an exterior diameter of about two and five-sixteenths inches, so that this standard pipe will readily fit between the two elements 30 when they are assembled with the plate 50, as illustrated in FIGS. 7–10, inclusive.

The assembly of the plate with the two elements 30 is first made by inserting the tabs 54 through restricted slots 56 formed in the web of the lower portion 31 beneath the aperture 37 and inserting the locator flanges 53 in open ended slots 57 formed in the flanges 35 at their vertical edges, the slots 56 and 57 being co-planar and of a vertical dimension only slightly larger than the thickness of the plate 50.

This assembly of the two elements 30 and the plate 50 is then vertically telescoped over the pipe post 24 until the upper extremity 58 of the pipe enters the arcuate recesses defined by the sloping wall section 39 of the flanges 36. The upper edge of the pipe will actually contact the sloping interior wall surface 42 on the underside of the flange 36, the conical configuration of this surface centering the assembly of the elements 30 and the plate 50 on the pipe, this centering action being aided by the projections 41 which extend downwardly into the interior of the pipe. This arcuate wall surface 42 has a radius, at its upper end, which is substantially the same as the radius of the pipe, and this arcuate wall 42 is concentric with the pipe.

Alternatively, the plate 50 may first be telescoped over the post 24, and the elements 30 then assembled onto the plate and secured thereto after the element flanges 36 are positioned by the post end.

Next, the tabs 52 are deformed by twisting them from their initial horizontal configuration as indicated in solid lines in FIG. 7 to an angular configuration as indicated in dotted outline in FIG. 7. The twisting of the tabs 52 can be readily accomplished by utilizing the claws of a claw hammer, a pair of pliers, a wrench or the like. This twisting action engages the inclined camming surfaces 54 of the tabs with the adjacent exterior surface of the element 30, and the camming surfaces pull the element 30 inwardly into snug engagement with the adjacent periphery of the plate 50. At this time, the pipe and the connector 21 are in assembly, but can be telescopically separated, if desired. The elements 30 have their lower ends 31 substantially completely embracing the upper extremity of the pipe 24, yet the assembly can be vertically removed from the pipe, if necessary or desired. Of course, the tabs 52 can be deformed immediately after the plate 50 and the elements 30 are assembled, as above explained, and prior to the positioning of the assembly on the post.

Next, the beams 22 are superimposed on the posts 24, the beams being interposed between the planar upper portions 32 of the connectors 21 to bear directly upon the flanges 36 of the two connecting elements 30. Finally, the beams are fixed to the elements 30, by bolts 45 or by nails 46, or a combination of bolts 45 or by nails 46, or a combination of bolts and nails as heretofore described in connection with the embodiment of FIGS. 4–6. The weight of the beams and of the remainder of the deck bearing directly downwardly upon the connectors 21 will retain the connectors in position upon the posts 24.

I claim:

1. A connector for alternatively interconnecting a wooden post with a beam and a metal post with a beam, the post being vertically elongated and the cross-sectional size of the wooden post being larger than that of the metal post, and the beam lying closely adjacent to the end of the post, the beam being rectangular in cross-sectional configuration and having its longitudinal axis normal to and aligned with the axis of the post, said connector comprising two complementary support elements each overlapping the juncture of the post and the beam, said elements, in combination, having first end portions partially embracing the end of the post and second portions contacting the opposite sides of the ajacent beam, said first end portions each having a central web lying parallel to the axis of the post and integral sides projecting normally from the central web, said second end portions each being planar for contacting opposite sides of said beam, and a flange integral with each support element and located intermediate said first and second end portions to project inwardly therefrom for overlying the end of said post, fastener means for securing said beam to the second end portions of said elements, and alternate means for securing said elements, respectively, to the post, said alternate means, where the post is wooden, comprising fastener means for projecting through said first end portions of said elements and into the wooden post, and said alternative means, where the post is metal, comprising a stabilizing plate separate and distinct from said elements, said plate (1) being of a size to fit between said elements when assembled on a metal post, (2) having a central aperture receiving said metal post therethrough and (3) being fixedly interconnected to the two elements to center the elements on the metal post in spaced relation to the end of the post.

2. A connector for interconnecting a vertical metal post and a horizontal beam vertically aligned with the post and closely adjacent to the end of the post, the post having an annular cross-section, said connector comprising two complementary support elements each overlapping the juncture of the post and the beam and said elements in combination having first end portions positioned on opposite sides of the upper end of the post and second end portions contacting the opposite sides of the beam, said first end portions each having a planar central web lying parallel to the axis of the post and integral side extensions projecting from the central web, said second end portions each being planar and adapted to receive the adjacent beam therebetween, a flange integral with each element and located intermediate said first and second end portions to project inwardly therefrom for overlying the end of said posts, each of said flanges having an arcuate recess adjacent its inward end for receiving therein the annular open end of the metal post, and a securing plate separate and distinct from said elements and interposed therebetween in spaced relation to said flanges, said plate (1) being rectangular and of a size to fit between said elements when said elements are assembled on the post, (2) having a central circular aperture for receiving said post therethrough, and (3) being adapted to be fixedly interconnected to the two elements, respectively, so that, upon assembly, said plate centers the elements on the post, and said plate, in combination with said arcuate recesses in said flanges, retains the elements on said post under the weight of said beam bearing on said flanges.

3. A connector for interconnecting a wooden post and a beam, the post having a vertical longitudinal axis and a rectangular cross-sectional configuration and the beam having a horizontal longitudinal axis normal to and vertically aligned with the axis of the post, said connector comprising a pair of side plates each overlapping the juncture of the post and the beam, said plates in combination having first end portions embracing the more than one-half of the periphery of the upper end portion of the post and second end portions contacting the opposite sides of the adjacent beam, said first end portions each having a central web lying parallel to the axis of the post and integral side projections projecting normally from the central web to contact opposing side surfaces of the post, said second end portions each being planar and contacting opposite sides of the beam, and a flange integral with each element and located intermediate said first and second end portions to project inwardly from said central web for overlying the end of said post, each of said flanges having depending sharpened projections thereon adapted to penetrate into the end of the wooden post, and fastner means for securing said first end portions to said post for securing said second end portions to said beam.

4. A connector for alternatively connecting a horizontal beam to a vertical wooden post and to a vertical metal post, the post being of rectangular cross-section where the post is wooden and of annular cross-section where the post is metal, said connector comprising two complementary support elements located to the juncture of the post and the beam, said elements, in combination, having lower end portions partially embracing the free upper end of the post and upper end portions contacting the opposite sides of the adjacent beam, said lower end portions being of rectangular channel configuration, and said second end portions each being planar, and a flange integral with each support element and located within the confines of said lower portions to project inwardly therefrom for overlying the end of said post, fastener means for securing said beam between the upper end portions of said elements, and alternate means for securing said elements, respectively, to the post, said alternate means, where the post is wooden, comprising fastener means for projecting through said first end portions of said elements and the wooden post, and said alternate means, where the post is metal, comprising a stabilizing plate sized to fit within said lower portions, said plate being centrally apertured to receive said metal post therethrough and means fixedly securing the plate to the two elements, the element flanges and the plate retaining the elements in telescopic assembly on the metal post.

5. A connector assembly for securing a horizontal beam to an upstanding wooden post and alternatively for securing a horizontal beam to a pipe post of smaller cross-sectional size than said wooden post, the connector assembly including a pair of complementary elements having lower portions of channel configuration of sufficient size to receive therein an adjacent end portion of said wooden post and planar upper portions, each element having a medial flange projecting inwardly, and a plate adapted to be interposed between the lower portions and having a post-receiving aperture therethrough, the elements alone being adapted for assembly on a wooden post to encase the upper end of the post with the flanges overlying and bearing directly on the adjacent end of the post, and the elements in combination with the plate interposed therebetween being adapted to be telescopically assembled over the upper free end of a pipe post, the plate and the flanges in combination stabilizing and positioning the plate-elements assembly on the post, so that regardless of the type of post the beam can be inserted between the upper ends of the elements to bear directly on the flanges.

6. A connector for joining a vertical metal pipe and a horizontal beam, said connector comprising two complementary support elements each overlapping the juncture of the post and the beam and said elements in combination having lower end portions adapted to be positioned on opposite sides of the upper end of the post and upper end portions for contacting the opposite sides of the beam, said lower end portions each being of channel configuration and having slots therein adjacent its lower extremity, and said upper end portions each being planar and adapted to receive the adjacent beam therebetween, a flange integral with each element and projecting inwardly therefrom for overlying the end of said posts, each of said flanges having an arcuate recess in its under surface for receiving therein the upper end of the metal pipe, and a securing plate separate and distinct from said elements and interposed therebetween beneath said flanges, said plate being of a size and shape to fit between said elements when said elements are assembled on the post, the plate having a central aperture for receiving said post therethrough and having locking tabs projecting through the slots in said lower end portion, said tabs being deformible to retain the elements and said plate in assembly, so that, upon assembly said plate centers the elements on the metal post in spaced relation to the end of the post, and said plate, in combination with said arcuate recesses in said flanges, retains the elements on said post under the weight of said beam bearing on said flanges.

7. In a connector for interconnecting a wooden post of rectangular cross-section and a beam, said connector comprising a pair of side plates each overlapping the juncture of the post and the beam;

the improvements of a flange integral with each element and located medially thereof to project inwardly therefrom for overlying the end of said post, each of said flanges having depending sharpened projections thereon adapted to penetrate into the end of the wooden post, and fastner means for securing said side plates to said post and to said beam, respectively, with said flanges interposed between said post and said beam, so that the weight of a structure borne by said beam bears directly on said flanges.

8. A connector for interconnecting a vertical metal pipe and a horizontal beam vertically aligned with the pipe and closely adjacent to the end of the pipe, said connector comprising two complementary support elements each overlapping the juncture of the pipe and the beam, and said elements in combination having lower end portions adapted to be positioned on opposite sides of the upper end of the pipe and upper end portions for contacting the opposite sides of the beam, a flange integral with each element and projecting inwardly therefrom for overlying the end of a pipe, and a securing plate separate and distinct from said elements and interposed between said lower portions in spaced relation to said flanges, said plate having a central circular aperture for receiving said pipe therethrough and means interconnecting said plate and said elements so that, in use, said plate centers the elements on the pipe, and said plate, in combination with said flanges retains the elements on said pipe under the weight of said beam bearing on said flanges.

9. A connector as defined in claim 8, wherein each flange has an arcuate recess in its undersurface defined by a conical surface concentric with the upper end of the pipe, said surface serving to locate the elements on the pipe end.

10. A connector as defined in claim 8, wherein each flange has, at its inner end, a depending projection for insertion into the adjacent open end of the pipe upon assembly.

11. A connector as defined in claim 8, wherein the interconnecting means includes interfitting slots and tabs for said elements and said plate.

12. A connector as defined in claim 11 wherein the tabs are on said plate and the slots are in said elements.

13. A connector as defined in claim 11, wherein the tabs project beyond the confines of the slot and the projecting tab portions are deformible to retain the plate in position.

14. A connector as defined in claim 13 wherein the tabs have camming surfaces engageable with the elements upon deformation to snugly abut the plate edges with the elements.

15. In an apparatus for connecting a wooden beam to an upright wooden post, wherein the apparatus includes a pair of identical side elements having lower channel portions for cooperatively embracing an end portion of the post and upper terminal flanges of planar configuration for cooperatively receiving therebetween a beam normal to the post, the improvement of a flange integral with each element and projecting inwardly intermediate the upper and lower portions thereof, said flanges being adapted to be interposed between the beam and the adjacent end of the post during assembly to aid in retaining said elements in position, and a downturned projection on each flange for engagement with the upper end of said post.

16. In an apparatus as defined in claim 15, the further improvement adapting said apparatus for connecting a wooden beam to an upright pipe, comprising a recess in each of said flanges receiving the adjacent end of the pipe, and a plate apertured to receive the plate therethrough, said pipe being connected to each of said elements and projecting therebetween to stabilize the elements on said pipe.

17. An apparatus adapted to connect a beam to a wooden post and, alternatively, adapted to connect a beam to a pipe post, comprising a pair of identical side elements having lower portions of channel configuration for cooperatively embracing an end portion of a post and having upper terminal flanges of planar configuration for cooperatively receiving therebetween a beam lying normal to said post, each element having an inwardly directed flange intermediate its lower portion and its upper flange to overlie the free upper end of the post, and a plate having utility only when the post is metal, said plate fitting between the lower portions of said elements, being secured thereto, and having a central aperture for receiving said pipe post therethrough.

* * * * *